(12) United States Patent
Gladden et al.

(10) Patent No.: US 6,918,274 B2
(45) Date of Patent: Jul. 19, 2005

(54) ENCLOSURE SECURING APPARATUS

(75) Inventors: Guy William Gladden, Santa Clara, CA (US); Bryan David Bolich, Davis, CA (US); Renato Ravanello, Saratoga, CA (US); Kong Wai Ki, Singapore (SG); Shahane Dhananjay, Singapore (SG); Kok Mam Lay, Singapore (SG); Amos Ho Chee Hoong, Singapore (SG); Daniel Ong Kwang Keen, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 10/074,658

(22) Filed: Feb. 13, 2002

(65) Prior Publication Data

US 2003/0150246 A1 Aug. 14, 2003

(51) Int. Cl.⁷ .............................................. E05B 13/00
(52) U.S. Cl. ............................ 70/208; 70/210; 292/107; 292/209; 292/336.3; 292/DIG. 30; 292/DIG. 31
(58) Field of Search ................... 70/208, 210; 292/107, 292/209, 336.3, DIG. 30, DIG. 31

(56) References Cited

U.S. PATENT DOCUMENTS

| | | | | |
|---|---|---|---|---|
| 2,642,300 A | * | 6/1953 | Pelcin | |
| 3,020,743 A | * | 2/1962 | Gehrie | |
| 4,068,873 A | * | 1/1978 | Testa et al. | 292/101 |
| 4,134,281 A | * | 1/1979 | Pelcin | 70/208 |
| 4,638,649 A | * | 1/1987 | Chao | 70/71 |
| 4,982,303 A | * | 1/1991 | Krenz | 292/223 X |
| 5,944,369 A | * | 8/1999 | Kapes | 292/336.3 |
| 6,039,363 A | * | 3/2000 | Sugimura et al. | 292/202 |
| 6,145,352 A | * | 11/2000 | Vickers et al. | 70/208 |
| 6,263,712 B1 | * | 7/2001 | Ramsauer | 70/208 |
| 6,298,697 B1 | * | 10/2001 | Ramsauer | 70/208 |
| 6,418,761 B1 | * | 7/2002 | Wytcherley et al. | 70/208 |
| 6,530,251 B1 | * | 3/2003 | Dimig | 70/237 |
| 2001/0033267 A1 | * | 10/2001 | Kim et al. | 345/156 |

FOREIGN PATENT DOCUMENTS

| | | | | |
|---|---|---|---|---|
| GB | 12514 | * | 10/1886 | 292/209 |
| JP | 403030088 | * | 2/1991 | 70/208 |

* cited by examiner

Primary Examiner—Lloyd A. Gall

(57) ABSTRACT

An enclosure securing apparatus including a handle housing disposed in a cover for an opening in an enclosure; a handle lever pivotably attached to the handle housing, the handle lever having first and second ends; a cam surface disposed at the first end of the handle lever for engagement with a lock housing; and a lock assembly integrated with the enclosure securing apparatus for locking the enclosure.

15 Claims, 10 Drawing Sheets

ENCLOSURE SECURING APPARATUS

FIELD OF THE INVENTION

This invention relates to enclosure securing mechanisms and methods.

BACKGROUND OF THE INVENTION

Common in the electronics, computer, and other industries are cabinets to house various components. Typically the cabinets comprise a sheet metal or plastic chassis arranged in a rectangular configuration with an access panel on one side. The access panel provides users admission to the interior of the cabinet and the access to the components housed therein so that the components can be upgraded, serviced, monitored, or otherwise maintained.

The access panels of typical electrical cabinets often include a lever arm to facilitate attachment of the access panel to the cabinet. One example of such a lever arm and access panel is shown in FIG. 1, which displays a network server computer cabinet housing a server.

FIG. 1 shows an access panel 20 with a lever 22 extending from the surface of the panel in an open position. When lever 22 is in the open position shown, access panel 20 may be freely removed from the cabinet chassis (not shown) in a direction normal to the surface of the access panel. However, when lever 22 is in a closed position with lever 22 flush with the surface of access panel 20, the access panel is secured to the cabinet chassis in the direction normal to the surface of the access panel (typically the access panel will include several hooks arranged about the perimeter of the access panel that mate with recesses in the chassis to support the access panel and secure it in other directions).

The lever 22 may include cam surfaces 24 shown in FIG. 2 that engage a box (not shown) located behind access panel 20. The box would generally be attached to the cabinet chassis and arranged such that as lever 22 is positioned flush with access panel 20, the cam surfaces abut the box tightly and prevent movement of the access panel in the direction normal to the panel. When the lever is lifted (as shown in FIG. 1), however, the cam surfaces disengage the box and allow the access panel to be removed from the cabinet chassis.

Referring again to FIG. 1, lever 22 is typically free to move between its open and closed positions with no restrictions, which often results in many problems. For example, if a user wishes to remove access panel 20 to admit herself to the cabinet, she will lift lever 22 to the open position so that the access panel disengages the box (not shown) and the panel can be removed. However, after releasing lever 22, it will generally tend to rotate back to the closed position (flush with access panel 20). When the user desires to replace the access panel, she will often attempt to do so without holding lever 22 in the open position. The attempt at replacing the panel without holding lever 22 may be a mere oversight (forgetting that the lever must be open) or it may be due to the fact that it is often difficult to both hold the lever open and engage the various hooks with their respective recesses to properly install the access panel.

Failing to hold the lever open results in inability to properly install access panel 20. Cam surfaces 24 interfere with the box (not shown) when lever 22 is in the closed position and access panel 20 cannot be securely attached to the cabinet chassis. Often a user may become frustrated and resort to deforming or destroying access panel 20, or just setting it aside when the panel cannot easily be reinstalled. Even if a user remembers to lift lever 22 while reinstalling access panel 20, the installation is more difficult and inconvenient because the user must allocate at least one appendage to holding the lever.

In addition, many times the components contained in a cabinet include sensitive equipment such as computers or other electronics that a user may wish to restrict access to. The lever systems currently available do not provide the users the ability to restrict removal of the access panels.

The present invention is directed to solving, or at least reducing the effects of one or more of the problems stated above.

SUMMARY OF THE INVENTION

The present invention provides an enclosure securing apparatus including: a handle housing disposed in a cover for an opening in an enclosure; a handle lever pivotably attached to the handle housing, the handle lever having first and second ends; a cam surface disposed at the first end of the handle lever for engagement with a lock housing; and a lock assembly integrated with the enclosure securing apparatus for locking the enclosure.

The present invention also provides a holding mechanism including: a housing; a lever arm attached to the housing, the lever arm including a first surface having first and second edges, wherein the first edge has a first wall extending therefrom, and the second edge has a second wall extending therefrom, the first and second walls extending in the same direction from said first surface; wherein the first and second walls each include a curvilinear surface; and where at least one of the curvilinear surfaces includes a protrusion disposed adjacent thereto for holding the lever arm in at least two positions.

The present invention also provides an enclosure securing apparatus including a handle housing; a handle lever pivotably attached to the handle housing, the handle lever having first and second ends; and a handle snap integrated with the handle housing for engagement with the lever arm when the handle lever is in a first position.

The present invention also encompasses a method of securing an enclosure to a chassis, where the enclosure includes a securing lever arm, including engaging the enclosure with the chassis without holding the lever arm.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The foregoing and other features and aspects of the invention will become further apparent upon reading the following detailed description and upon reference to the drawings in which.

Throughout the drawings, identical elements are designated by identical reference numbers.

Figure 1:
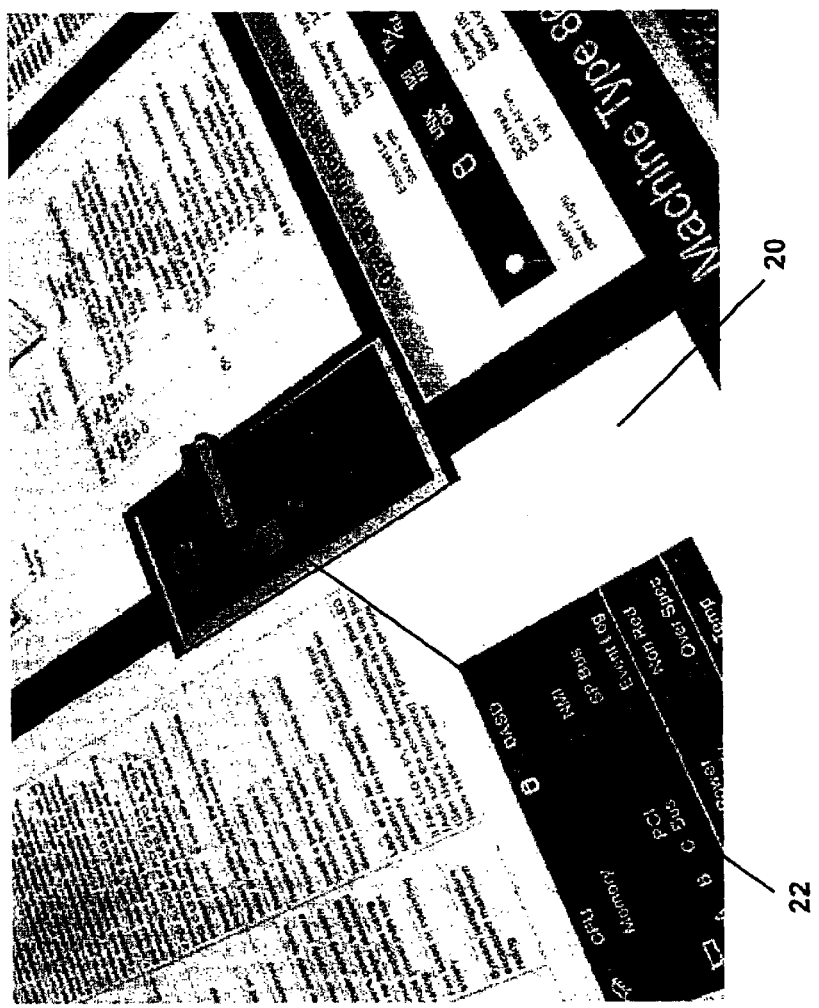
FIG. 1 is a front view of a conventional network server cover.
Figure 2:
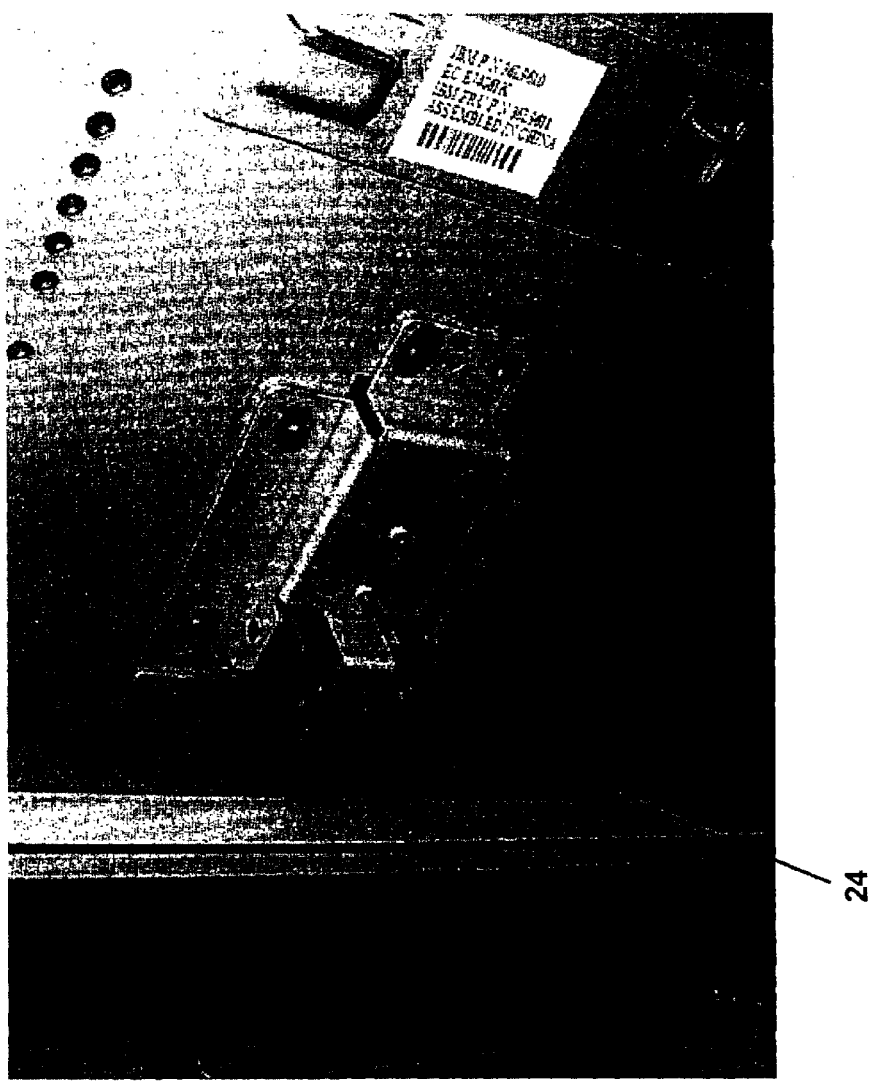
FIG. 2 is a back view of the conventional network server cover of FIG. 1.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

Figure 3:
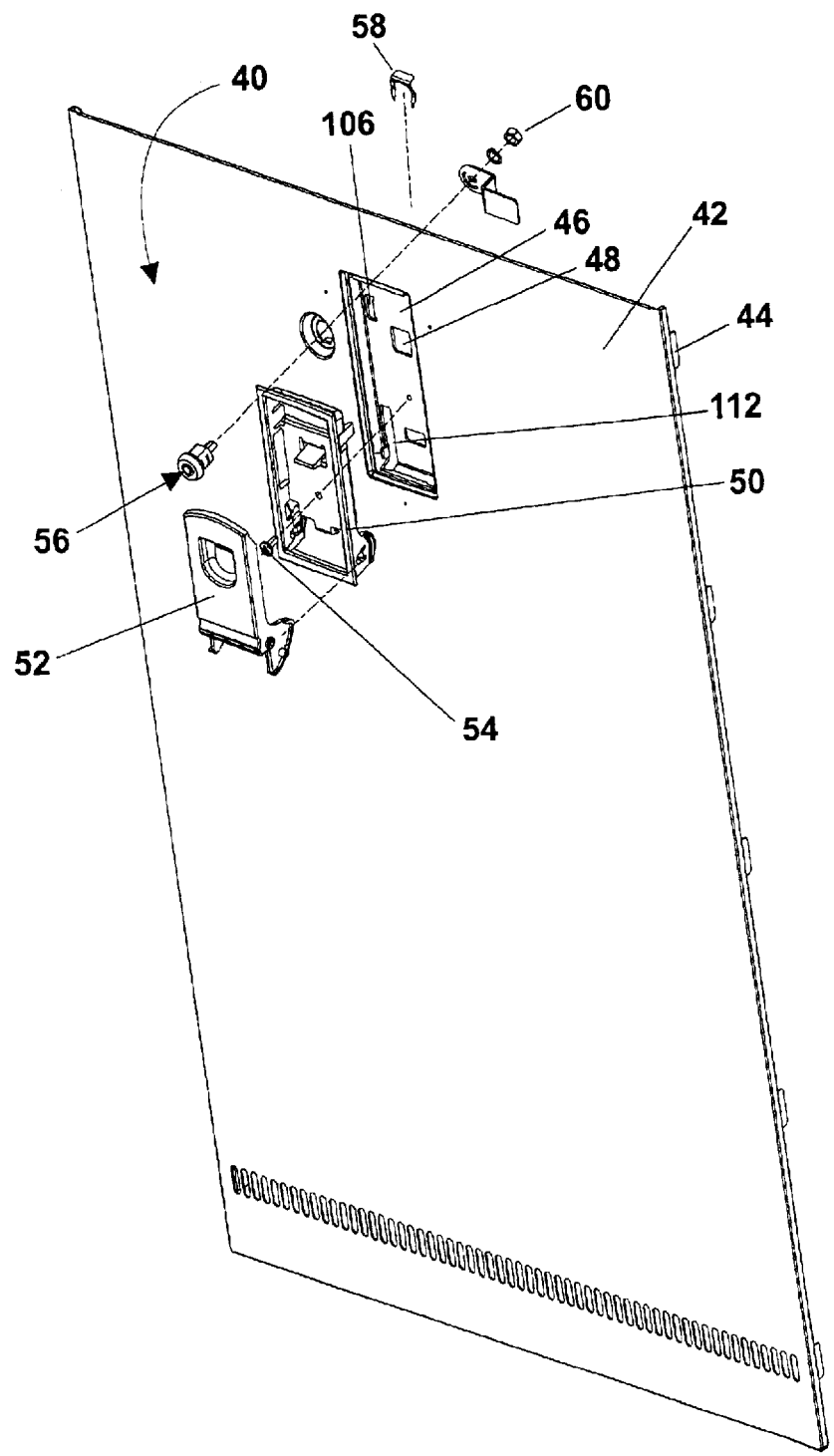
FIG. 3 is an assembly view of an enclosure securing apparatus according to one embodiment of the present invention.

Turning now to the drawings, and in particular to FIG. 3, an enclosure securing and holding apparatus 40 in an assembly view is shown. In the embodiment of FIG. 3, enclosure securing apparatus 40 is shown in relation to a cover 42. According to the embodiment of FIG. 3, cover 42 is a computer housing access panel, for example a network server housing cover, but this is not necessarily so. Cover 42 may be for any enclosure for allowing access to the interior of that enclosure.

Cover 42 is shown with tabs 44 extending therefrom to engage a cabinet, but any other attachment facilitating mechanisms may also be included with cover 42. Cover 42 may also include an indention 46 and one or more holes 48 for receiving enclosure securing apparatus 40.

Enclosure securing apparatus 40 may include a handle housing 50 and a lever arm such as handle lever 52. Handle housing 50 may be attached to cover 42 by a fastener, for example screw 54. Handle housing 50 may be seen in more detail in FIGS. 7–8, which are further discussed below.

Enclosure securing apparatus 40 may also include a lock assembly 56 for locking handle lever 52 and/or cover 42. Lock assembly 56 may be attached to cover 42 by one or more fasteners such as clip 58 and nut 60.

Enclosure securing apparatus 40 may, when fully assembled, hold cover 42 to a chassis or cabinet.

Figure 4:
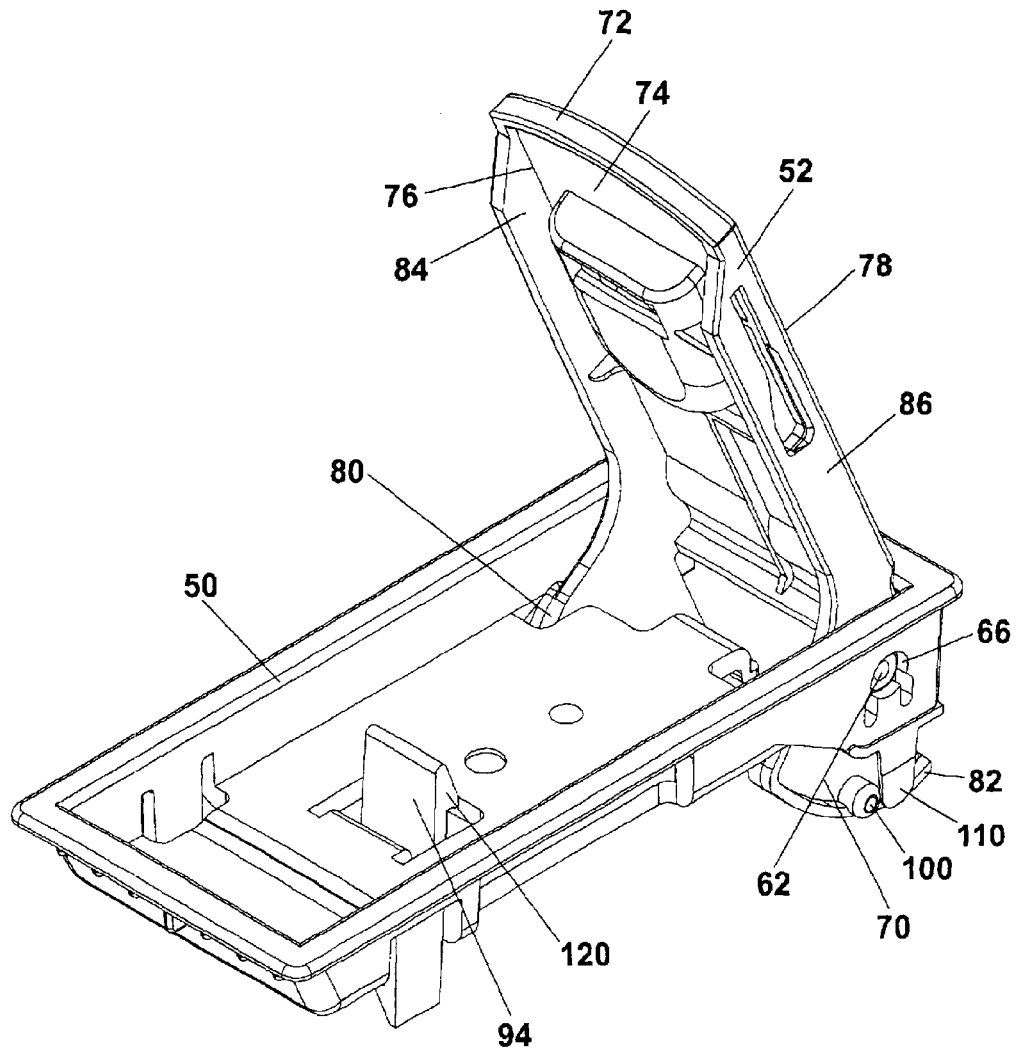
FIG. 4 is a perspective view of an enclosure securing apparatus according to one embodiment of the present invention.

Turning next to FIG. 4, enclosure securing apparatus 40 is shown with handle lever 52 pivotably attached to handle housing 50. The pivotal attachment between handle lever 52 and handle housing 50 may be facilitated by snap-fitting protrusions 62 and 64 of handle lever 52 (protrusion 64 may be seen in FIG. 6) into holes 66 and 68, respectively, of handle housing 50 (hole 68 may be seen in FIG. 8).

Figure 11:
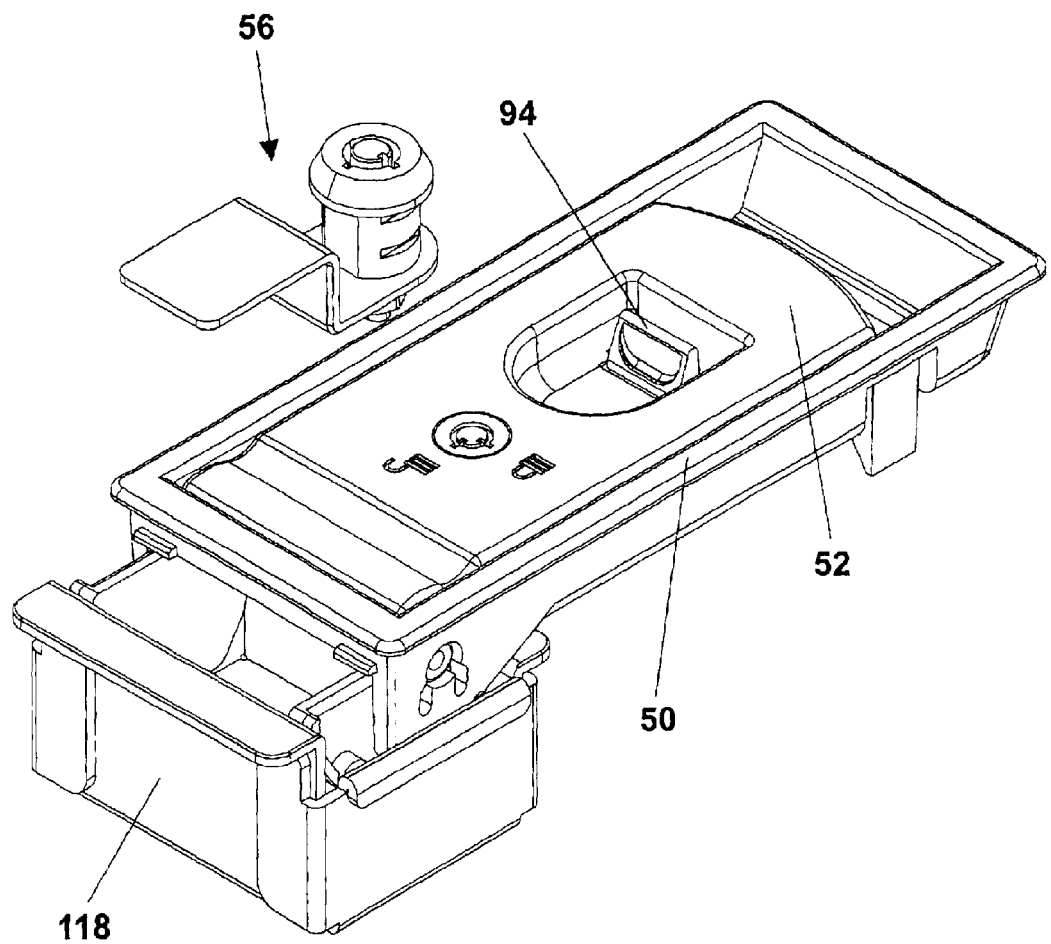
FIG. 11 is a perspective view of an enclosure securing apparatus in a closed position according to one embodiment of the present invention.

Based in part on the pivotal attachment of handle lever 52 to handle housing 50 as shown in FIG. 4, handle lever 52 may be selectively positioned in at least two positions. The first or closed position includes handle lever 52 arranged substantially flush with handle housing 50 (an example is shown in FIG. 11). The second or open position is shown in FIG. 4 in which handle lever 52 creates an angle with handle housing 50.

Figure 5:
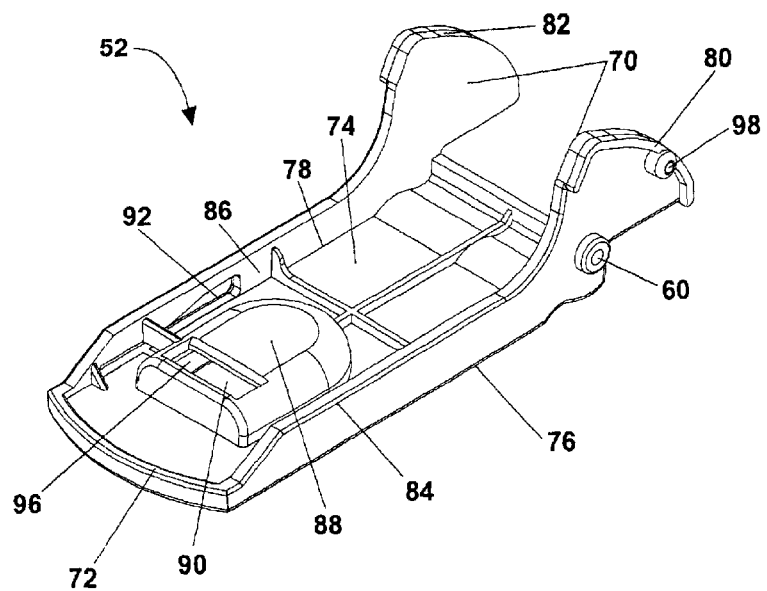
FIG. 5 is a perspective view of a handle lever according to one embodiment of the present invention.
Figure 6:
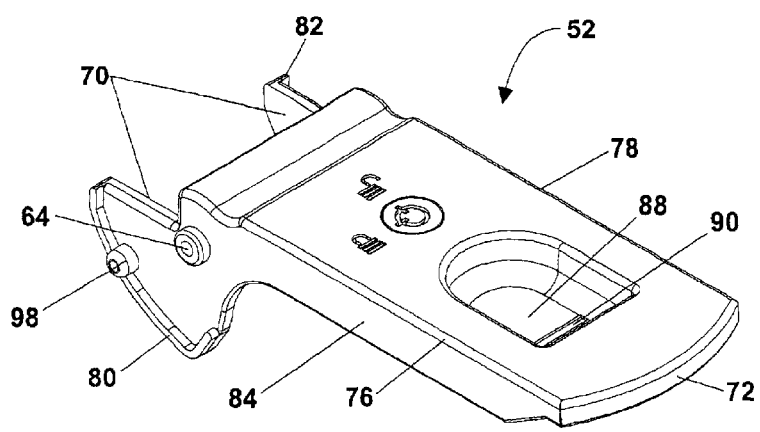
FIG. 6 is a second perspective view of the handle lever of FIG. 5

Turning next to FIGS. 5 and 6, a detail of handle lever 52 is shown. Handle lever 52 may be manufactured of molded plastic or other material. Handle lever 52 may include first and second ends 70 and 72, and a first surface 74 having first and second edges 76 and 78. First end 70 of handle lever 52 may include one or more cam surfaces, for example curvilinear surfaces 80 and 82. In the embodiment of FIGS. 5–6, handle lever 52 includes first and second walls 84 and 86 extending from first and second edges 76 and 78, respectively, of first surface 74. First and second walls 84 and 86 define curvilinear surfaces 80 and 82 at first end 70 of handle lever 52. It will be understood, however, that some embodiments handle lever 52 may include only a first wall and an associated first curvilinear surface.

In the embodiments shown, handle lever 52 includes protrusions such as detents 98 and 100 at first end 70 of the handle lever (detent 100 is show in FIG. 4). Detent 98 may be located along first curvilinear surface 80 and detent 100 may be located along second curvilinear surface 82. In some embodiments, however, only one of detents 98 and 100 is used. The operation of detents 98 and 100 is discussed below.

Handle lever 52 may also include a first hole 92 in one or both of first and second walls 84 and 86. In the present embodiment, hole 92 is shown in second wall 86. Handle lever 52 may also include an indention 88 in first surface 74. Indention 88 may include a second hole 90 disposed therein. Second hole 90 is receptive of a handle snap 94 (shown in FIG. 4). Indentation 88 may further include a ridge (not shown) along an edge 96 of hole 90 to facilitate a snap fit between handle snap 94 and handle lever 52. The operational relationship of handle snap 94 with handle lever 52 is discussed below.

Figure 8:
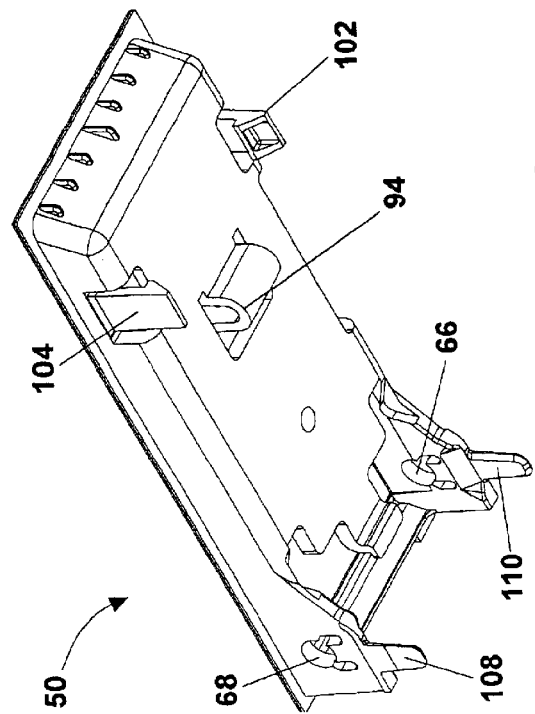
FIG. 8 is a second perspective view of the handle housing of FIG. 7.
Figure 7:
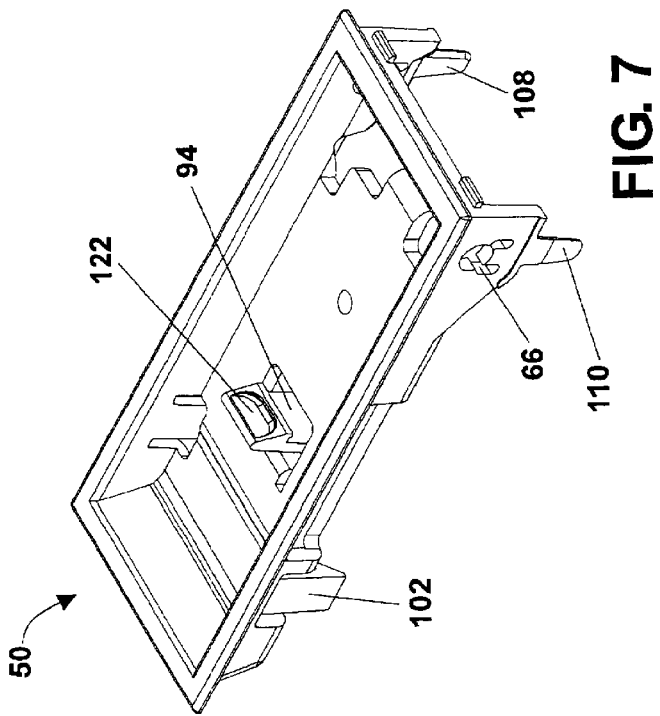
FIG. 7 is perspective view of a handle housing according to one embodiment of the present invention.

Turning next to FIGS. 7 and 8, details of handle housing 50 are shown. Handle housing 50 may be manufactured of molded plastic or other material and may include integrated handle snap 94 molded therein. Integrated handle snap 94 advantageously provides for a housing and snap integrated into a single piece.

In the embodiment shown, handle housing 50 includes tabs 102 and 104 for insertion through holes 106 of cover 42 (shown in FIG. 3). Tabs 102 and 104 may snap fit with holes 106 of cover 42 to facilitate attachment of handle housing 50 to cover 42. Further, handle housing 50 may include first and second wing elements 108 and 110, which, in the present embodiment extend from handle housing 50 in the same direction as tabs 102 and 104. Wing elements 108 and 110 may extend through holes 112 of cover 42 (shown in FIG. 3) to facilitate the holding of handle lever 52 in the open position.

Figure 9:
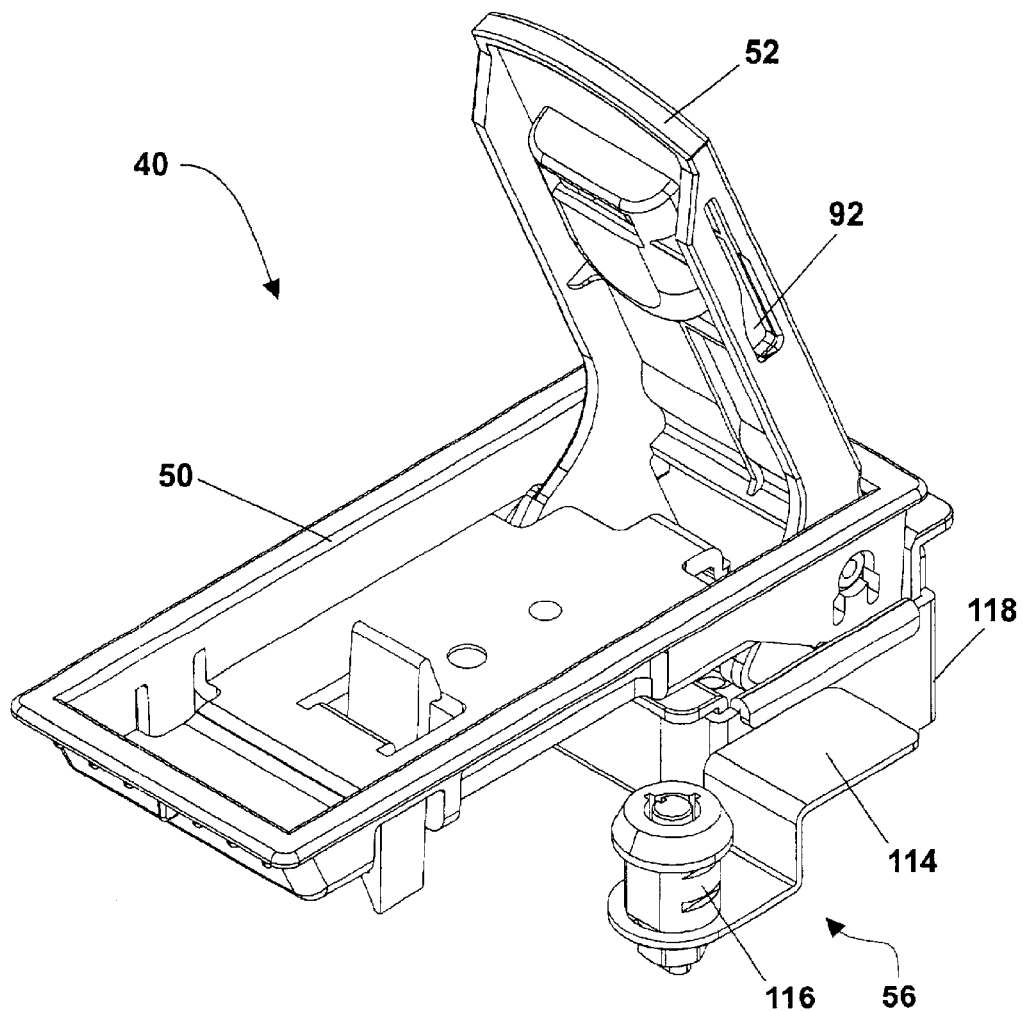
FIG. 9 is a perspective view of an enclosure securing apparatus according to one embodiment of the present invention.

Turning next to FIG. 9, enclosure securing apparatus 40 is shown with handle housing 50 and handle lever 52 attached to one another and handle lever 52 in the second or open position. Lock apparatus 56 is shown adjacent to handle housing 50 and handle lever 52. Lock apparatus 56 may include a shank 114 rotatably attached to a keyed tumbler 116. Lock apparatus 56 is advantageously integrated with enclosure securing apparatus 40 such that handle lever 52 may itself be locked, eliminating the need for additional separate locks in cover 42.

In order to lock handle lever 52 in the first or closed position, shank 114 may be rotated to extend through first hole 92 of the handle lever. Shank 114 may be rotated by the turning of a key (not shown) which may be inserted into tumbler 116.

It will be understood that shank 114 and keyed tumbler 116 may also be arranged in another well known configuration such that rotation of the keyed tumbler initiates linear—rather than rotational—movement of the shank into first hole 92.

Figure 10:
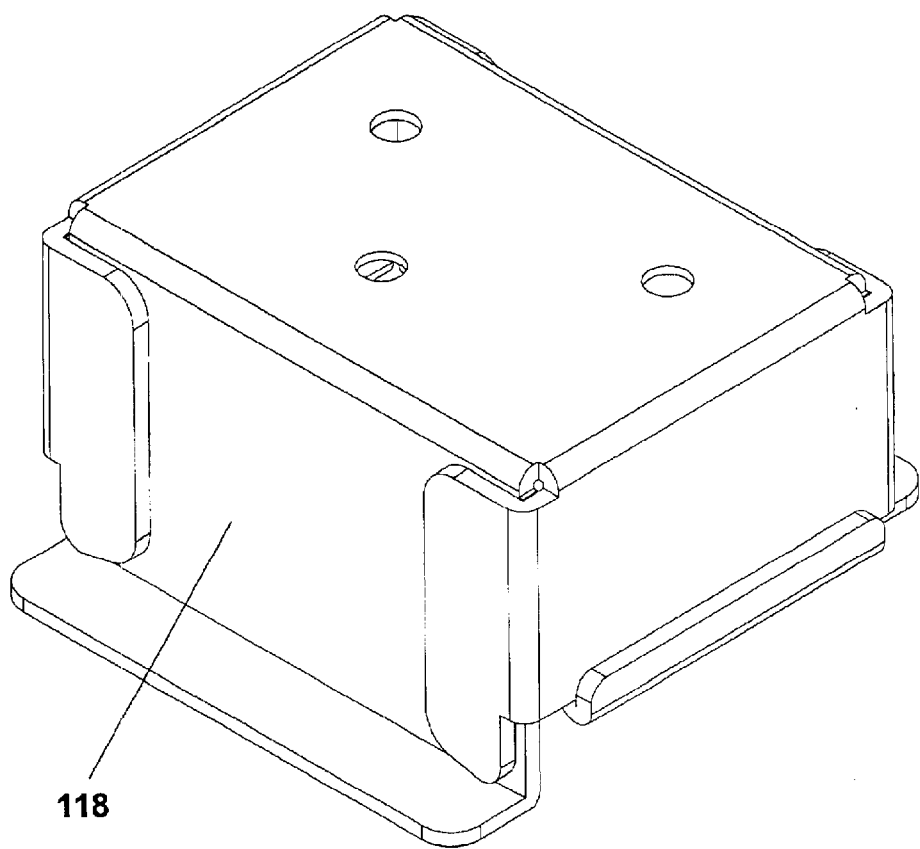
FIG. 10 is a perspective view of a lock housing according to one embodiment of the present invention.

According to FIG. 9, a lock housing portion of enclosure securing apparatus 40 is also shown. Lock housing 118 can be seen in detail in FIG. 10. Lock housing 118 may not house lock assembly 56, but instead may engage curvilinear surfaces 80 and 82 of handle lever 52. In the embodiment shown, lock housing 118 is manufactured of metal or other material and is located on the inside of cover 42 and attached to the chassis or cabinet that cover 42 is enclosing.

Lock housing 118 is shown as a generally rectangular box, but this is not necessarily so. Lock housing 118 may be any convenient shape to engage curvilinear surfaces 80 and 82. The engagement between lock housing 118 and curvilinear surfaces 80 and 82 is discussed below.

Figure 12:
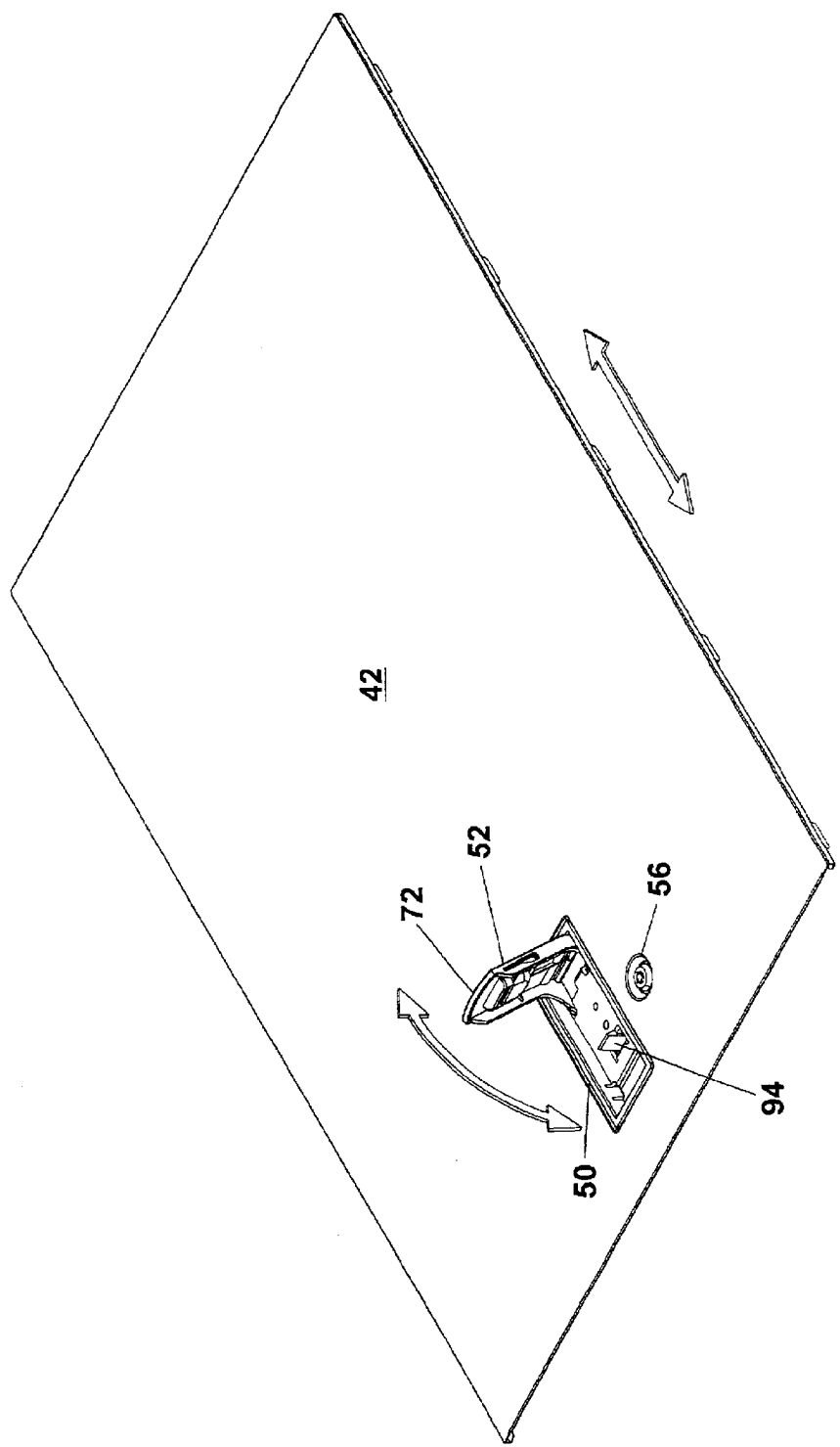
FIG. 12 is a perspective view of an enclosure securing apparatus in an open position according to one embodiment of the present invention.

When enclosure securing apparatus 40 is assembled according the assembly drawing of FIG. 3, cover 42 may be attached and secured to a cabinet or chassis. To facilitate the attachment of cover 42 to a cabinet or chassis, handle lever 52 may be pivoted from the first or closed position shown in FIG. 11 to the second or open position shown in FIG. 12. In order to pivot handle lever 52 from the closed position to the open position, sufficient force must be applied to second end 72 of the handle lever to urge detents 98 and 100 past wing elements 108 and 110, respectively. (see FIG. 4). Detents 98 and 100 may be rounded such that a minimum force applied to handle lever 52 causes wing elements 108 and 110 to deflect as detents 98 and 100 pass thereby. When handle lever 52 reaches the open position, detents 98 and 100 will have passed by wing elements 108 and 110, and the wing elements will no longer be deflected. Wing elements 108 and 110 in combination with detents 98 and 100 thereafter advantageously support handle lever 52 and prevent the handle lever from inadvertently returning to the closed position while a user attempts to install cover 42 as depicted in FIG. 12. Handle lever 52 will remain in the open position until a sufficient force is applied to overcome the bias of the wing elements abutting the detents.

With handle lever 52 in the open position, cover 42 may be placed into proper engagement with a respective cabinet or chassis. Once cover 42 is correctly installed, handle lever 52 may be pivoted to the closed position shown in FIG. 11.

A sufficient force applied to handle lever 52 will urge detents 98 and 100 to deflect past wing elements 108 and 110 toward the closed position. Further, curvilinear surfaces 80 and 82 will engage lock housing 118. It is within the ordinary skilled artisan's purvey to size lock housing 118 and shape curvilinear surfaces 80 and 82 such that a secure engagement between them may be achieved by the pivoting rotation of handle lever 52.

Substantially simultaneous with the movement of handle lever 52 to the closed position is the engagement of handle snap 94 with the handle lever. As handle lever 52 rotates to the closed position, handle snap 94 extends through second hole 90 of handle lever 52. Second hole 90 and handle snap 94 may be sized such that handle snap 94 is deflected by handle lever 52 as the handle lever is moved to the closed position. When handle lever 52 reaches the fully closed position, a ledge 120 of handle snap 94 may be biased to engage handle lever 52. Handle snap 94 may be sufficiently biased to automatically snap ledge 120 over an edge 96 of second hole 90. The snap-fit between handle snap 94 and handle lever 52 reduces the chance of inadvertent release of the handle lever from the closed to the open position. Handle snap 94 may include a recess 122 to facilitate the release of handle snap 94 from engagement with handle lever 52 by a user.

According to the features of enclosure securing apparatus 40, with handle lever 52 in the closed position, movement of cover 42 is constrained such that it may not be removed from the cabinet or chassis. Further, with the handle lever 52 in the closed position, lock assembly 56 may engage the handle lever and restrict access to releasing the handle lever to the open position. As described above, shank 114 may be inserted through first hole 92 of handle lever 52 to prevent the pivoting thereof to the open position.

However, when an authorized user desires to remove cover 42, she may unlock locking assembly 56 (if the shank has been engaged with handle lever 52), release handle snap 94, and urge the handle lever to the open position. Once the handle lever is pivoted to the open position, detents 98 and 100 in combination with wing elements 108 and 110 tend to hold handle lever 52 in the open position. Therefore, when the user replaces cover 42, she will not need to remember to open the handle lever or be inconvenienced with manually holding the handle lever open while trying to properly reinstall the cover.

The preceding description has been presented only to illustrate and describe the invention. It is not intended to be exhaustive or to limit the invention to any precise form disclosed. Many modifications and variations are possible in light of the above teaching.

The preferred embodiments were chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A holding mechanism comprising:
   a lever handle housing for housing a lever handle when said lever handle is in a closed position; and
   a lever arm comprising said lever handle attached to the housing, an end of the lever arm opposite said lever handle extending through a hole in said housing;
   wherein said lever handle housing comprises at least one deflectable wing extending at said hole in said housing; and wherein said end of said lever arm comprises at least one protrusion disposed to interfere with said at least one wing such that said lever arm is maintained in an open or closed position by abutments of said at least one protrusion and said at least one wing unless sufficient force is applied to deflect said wing and allow said protrusion to pass by said wing.

2. The mechanism of claim 1, further comprising a lock having a moveable shank.

3. The mechanism of claim 1, wherein the end of said lever arm comprises two protrusions on opposite sides of said end of said lever arm; and wherein the housing further comprises two wings disposed on opposite sides of said end of said lever arm and adapted for releasing engagement with said protrusions.

4. The mechanism of claim 1, wherein said protrusion comprises a rounded surface to facilitate movement past said at least one wing element with the application of force to said lever arm.

5. The mechanism of claim 2, wherein said shank, when in a locked position, extends through a second hole in said housing.

6. The mechanism of claim 5, wherein said shank, when in a locked position, extends through both said second hole in said housing and a hole in said lever handle.

7. The mechanism of claim 1, wherein said lever arm further comprises a snap-fit protrusion on either side of said lever arm for snapping into corresponding holes in said housing, said snap-fit protrusions comprising an axis on which said lever arm turns.

8. The mechanism of claim 1, further comprising a handle snap integrated with said housing for engagement with said lever arm when said lever handle is in a closed position.

9. A method of selectively securing an access panel comprising:

providing a lever handle housing for housing a lever handle when said lever handle is in a closed position, said housing being disposed in said access panel and comprising at least one deflectable wing extending at a hole in said housing;

attaching a lever arm comprising said lever handle to the housing, an end of the lever arm opposite said lever handle extending through said hole in said housing and comprising at least one protrusion disposed to interfere with said at least one wing;

maintaining said lever arm in an open or closed position by abutments of said at least one protrusion and said at least one wing until sufficient force is applied to deflect said wing and allow said protrusion to pass by said wing.

10. The method of claim 9, wherein the end of said lever arm comprises two protrusions on opposite sides of said end of said lever arm; and wherein the housing further comprises two wings disposed on opposite sides of said end of said lever arm and adapted for releasing engagement with said protrusions.

11. The method of claim 9, further comprising rounding said protrusion to facilitate movement past said at least one wing with the application of force to said lever arm.

12. The method of claim 9, further comprising selectively locking said lever arm in place with a moveable shank.

13. The method of claim 12, wherein said locking comprises moving said shank to extend through a second hole in said housing and a hole in said lever handle.

14. The method of claim 9, further comprising snapping a snap-fit protrusion on either side of said lever arm into corresponding holes in said housing, said snap-fit protrusions comprising an axis on which said lever arm turns.

15. The method of claim 9, further comprising engaging said lever handle in a closed position with a handle snap integrated with said housing.

* * * * *